Jan. 6, 1970 L. E. SVENSSON 3,487,770
ELECTRIC TOASTER
Filed Nov. 8, 1967 4 Sheets-Sheet 1

United States Patent Office 3,487,770
Patented Jan. 6, 1970

3,487,770
ELECTRIC TOASTER
Lars Erik Svensson, Tullinge, Sweden, assignor to
AB Industrifjadrar, Monsteras, Sweden
Filed Nov. 8, 1967, Ser. No. 681,359
Claims priority, application Sweden, Apr. 24, 1967,
5,717/67
Int. Cl. A47j 37/08
U.S. Cl. 99—334                        3 Claims

ABSTRACT OF THE DISCLOSURE

An electric toaster comprising electric heating elements for receiving between them the slice or slices to be toasted. A feed mechanism is adapted to feed the slices one at a time from a supply along a slideway located between the heating elements and has associated with it manually operable control means for varying the feed speed and thereby the degree of toasting, and an automatically operating device which in response to the temperature of the heating elements increases or decreases the feed speed to provide a uniform toasting irrespective of changes in said temperature. The power supply to both the feed mechanism and the heating elements is controlled by means sensing the presence of slices in the supply, and the sensing means is associated with delay means to permit the last slice in the supply to pass between the heating elements.

---

This invention relates to an electric toaster comprising a pair of electric heating elements each of which is adapted to radiate one side of an interposed slice of bread to be toasted.

Characteristic of the electric toaster according to the invention is that it incorporates a slideway located between the two heating elements, a feed chain or like means driven by an electric motor at a variable speed and adapted to move the slices to be toasted one at a time along said slideway, current control means operable by the ever increasing temperature of the energized heating elements for varying the speed of the electric motor, said current control means being adapted to increase the speed of the motor with increasing temperature, a switch sensing the presence of untoasted slices of bread kept in a supply and supplying current to the heating elements associated with the same source of current as the motor, and a delay switch associated with said first switch and adapted to break the current supply after the period required for the slice of bread to move along the slideway between the elements.

These features of the invention and the advantages gained thereby will be more fully described in the following with reference to the accompanying diagrammatic drawings in which.

Figure 1:
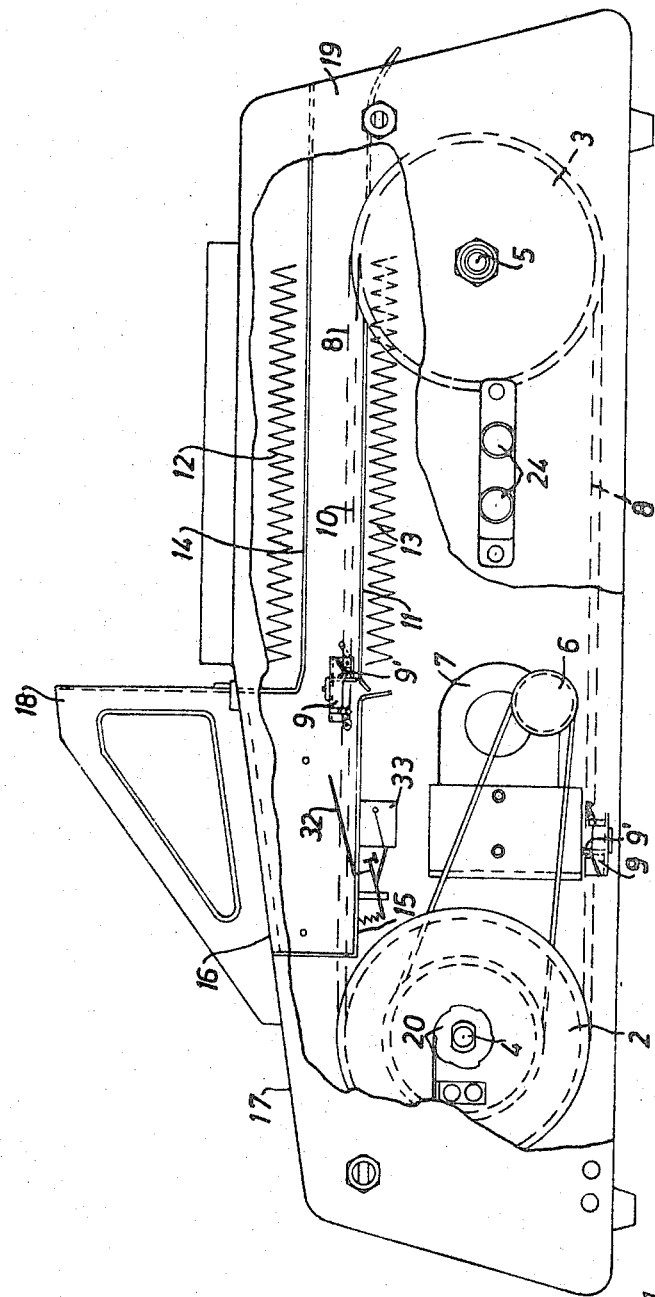
FIGURE 1 is a side view of the electric toaster with the casing partly broken away.
Figure 2:
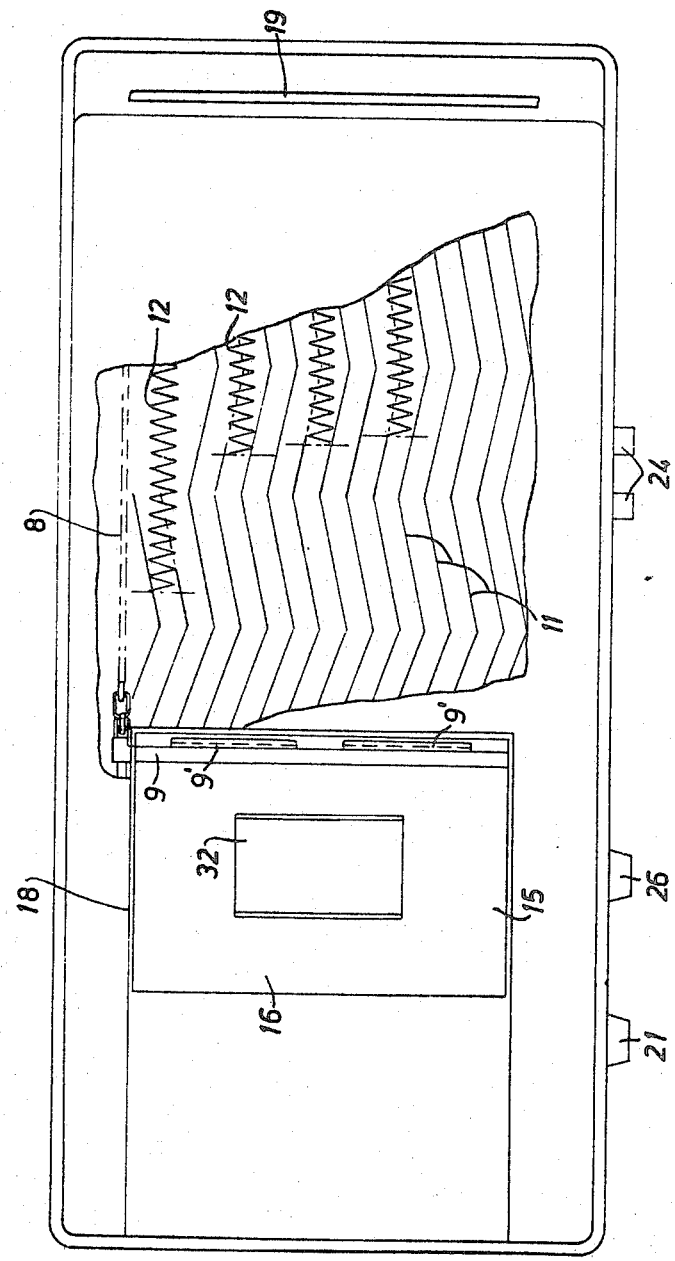
FIGURE 2 is a top plan view of the toaster likewise with the casing partly broken away.
Figure 3:
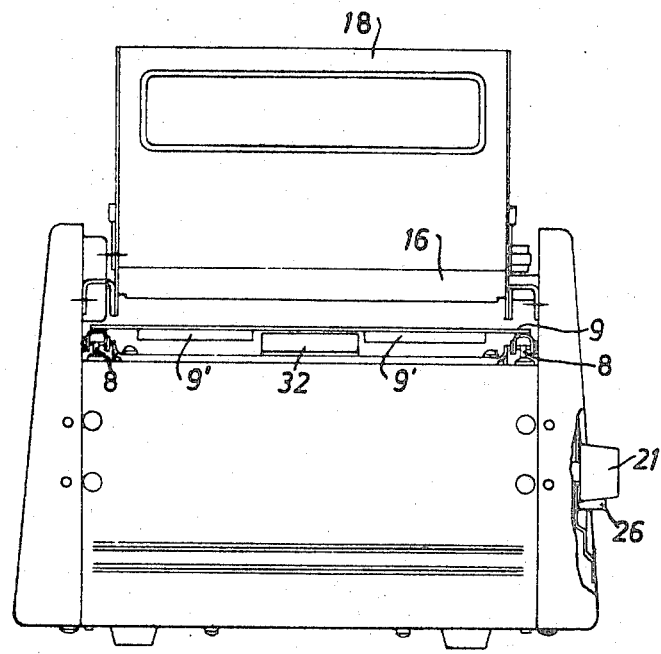
FIGURE 3 is an end view of the toaster.

In the drawing, 1 denotes the frame and the casing surrounding the toaster. Mounted at each end of the frame is a pair of shafts 4 and 5, respectively, carrying sprocket wheels 2 and 3, respectively. The shaft 4 is driven via a gearing 6 by the electric motor 7. The sprocket wheels 2 drive the feed chain 8 which is passed around the two pairs of sprocket wheels. The feed chain 8 comprises two rows of links between which are arranged cross pieces 9 spaced apart longitudinally of the chain. To avoid crowding of the drawing, only two cross pieces 9 are shown in the drawing. The cross pieces 9 have dog means 9' which serve to advance the slices to be toasted, the upper run 10 of the feed chain being thus adapted to move the slices to be toasted. Arranged along the upper chain run is a slideway comprising a wire grid 11 in which the wires extend in zig zag arrangement to the direction of feed. Filament heating elements 12 and 13, respectively, are mounted above and beneath said slideway. The space between the protective grid 14 beneath the upper element 12 and the slideway 11, which lies close to the lower heating element 13, is adapted to a slice of bread of normal thickness, the two heating elements being situated as close as possible to the slice to be toasted.

Due to the zig zag arrangement of the wires forming the slideway 11 the slices will not be singed by the wires which will be heavily heated by the heating elements.

In the illustrated embodiment of the electric toaster the untoasted bread slices are to be placed on the support plate 15 which is disposed beneath the opening 16 in the upper side 17 of the toaster. A supporting frame 18 which also serves as a handle is disposed around said opening 16. At the opposite end of the slideway 11 the bread slices are discharged through the opening 19.

The shaft 4 carrying the sprocket wheels is provided with freewheel means 20 which permits the shaft to be rotated in the feed direction irrespective of the motor being in operation or not, with the aid of a handwheel 21 disposed on the outer side of the toaster casing.

Figure 4:
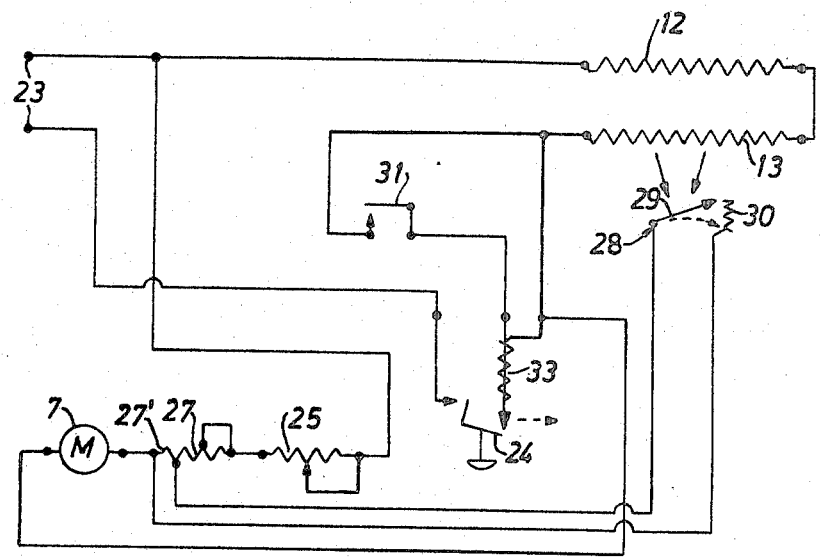
FIGURE 4 is the wiring diagram of the toaster.

The current supply form the source of current 23 to the electric toaster system shown in FIGURE 4 is controlled primarily by means of the main switch 24. Series-connected in the motor circuit is an adjustable resistor 25 which is operable by means of a knob 26 for adjusting the sped of the motor and thus the degree of toasting responsive to the time it takes the slices to move past the heating elements 12, 13. A fixedly set resistor 27 is interposed between the adjustable resistor 25 and the motor 7 and with the aid of said fixedly set resistor 27 the motor speed is roughly adjusted. A control device 28 operable by the heat of the heating elements is connected in parallel over a part 27' of the resistor 27. The control device 28 comprises a contact arm 29 which is operable by a bimetal member and which from the breaking position illustrated is shiftable into contact with the resistor 30 by the influence of the heat of the heating elements on the bimetal member. To begin with, the entire resistor 30 is connected and as the contact arm is displaced with increasing element temperature the resistor is disconnected. The resistance values of the part 27' of the fixedly set resistor 27 and the entire resistor 30 are broadly equal. In the position shown in the wiring diagram the heat of the heating elements has not actuated the arm 29, the motor current flowing through the resistor part 27'. When the heat increases the arm 29 comes into contact with resistor 30 and as soon as the contact arm has reached the position at the resistor 30 in which the resistance value falls belo wthe value of the resistor part 27' the last-mentioned resistor is rendered inoperative. The motor current will then flow instead through the contact arm 29 and the remaining portion of resistor 30 which results in an increasing motor speed as the resistor 30 is disconnected by the displacement of the arm 29. In this way a set toasting degree will be maintained irrespective of whether the temperature of the heating elements gradually rises.

The heating elements 12 and 13 have associated with them a circuit which is separate from the motor circuit and is likewise connectible via the main switch 24. This circuit includes a switch 31 which is operable by a spring biased rocker 32 arranged at the plate 15 serving as a support for the slices of bread. When the slices are placed on the plate 15 the rocker 32 will be pressed down and current supplied to the heating elements. To prevent the current supply of the heating elements from being broken at the moment when the last slice leaves the plate 15 and the rocker 32 returns to unactuated condition a bimetal-operated switch 33 is arranged in parallel with the switch 31. Over said switch, which has a higher resistance than the line through the switch 31 and thus is normally made inoperative, the current supply of the elements is kept up for the time it takes the last slice to pass the heating elements. When this has occurred the bimetal switch 33 which in the meantime has been actuated by the heat generated by the current will cause a break of the current supply both to the elements and to the motor. The last-mentioned switch thus also serves as an overheating protection means by breaking the current after a certain time when the electric toaster is empty.

The electric toaster according to the invention can provide any desired degree of toasting simply by regulation of the motor speed. The automatic speed regulation of the motor in relation to the temperature of the heating elements thereby provides precisely the same toasting of a plurality of slices irrespective of the length of the time the toaster has been connected.

What I claim and desire to secure by Letters Patent is:

1. An electric toaster comprising a pair of electric heating elements each of which is adapted to radiate one side of an interposed slice of bread to be toasted, a slideway located between the two heating elements, a feed chain or like means driven by an electric motor at a variable speed and adapted to move the slices to be toasted one at a time along said slideway, current control means operable by the ever increasing temperature of the energized heating elements for varying the speed of the electric motor, said current control means being adapted to increase the speed of the motor with increasing temperature, a switch sensing the presence of untoasted slices of bread kept in a supply and supplying current to the heating elements associated with the same source of current as the motor, and a delay switch associated with said first switch and adapted to break the current supply after the period required for the slice of bread to move along the slideway between the elements, said feed chain including two spaced rows of links, cross pieces arranged between said link rows and spaced apart longitudinally of the chain, said cross pieces serving as dog means to advance the stacked slices to be toasted, beginning with the lowermost slice in the stack, along said slideway formed of wires in zigzag arrangement.

2. An electric toaster as claimed in claim 1, in which said means controlling the motor speed in response to the temperature of the heating elements includes an adjustable resistor having a contact arm actuatable by a bimetal member, a fixedly set resistor connected in series with said motor and in parallel with said adjustable resistor, the resistance value of the fixedly set resistor being higher than or approximately the same as the resistance value of the entire value of said adjustable resistor, and the speed of said motor being arranged to increase accordingly as said adjustable resistor is moved by the influence of said heating elements toward a complete short-circuiting of said fixedly set resistor.

3. An electric toaster as claimed in claim 1, wherein said delay switch is parallel-connected with said switch sensing the presence of untoasted slices and controlling the power supply to said heating elements, said delay switch being a bimetal contact member arranged as a resistor and being short-circuited by said sensing switch when the said delay switch is closed, while in the breaking position of said sensing switch said bimetal contact member is current conductive and by reason of the resulting heating is adapted after a given time to interrupt the power supplied to said heating elements and said motor.

References Cited

UNITED STATES PATENTS

| 1,555,336 | 9/1925 | Vaughan | 99—386 XR |
| 1,717,926 | 6/1929 | Horowitz | 99—387 |
| 1,963,924 | 6/1934 | Smith | 99—334 |
| 2,151,401 | 3/1939 | Belcher | 99—387 XR |
| 2,447,641 | 8/1948 | Dunham | 99—334 XR |
| 2,850,961 | 9/1958 | Rettig | 99—387 |
| 3,400,651 | 9/1968 | Hatch | 99—386 |

BILLY J. WILHITE, Primary Examiner

U.S. Cl. X.R.

99—337, 387